Patented Jan. 2, 1951

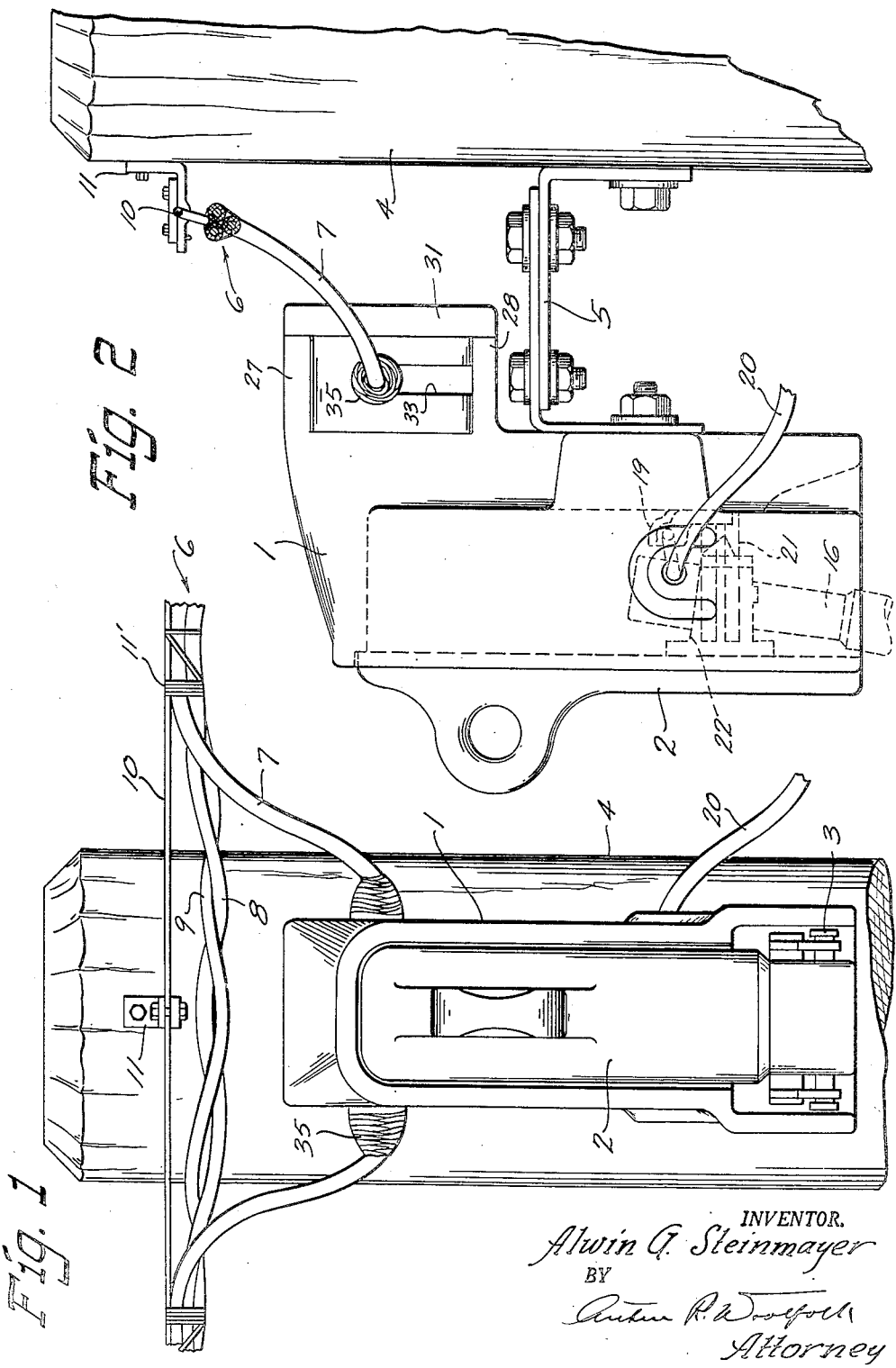

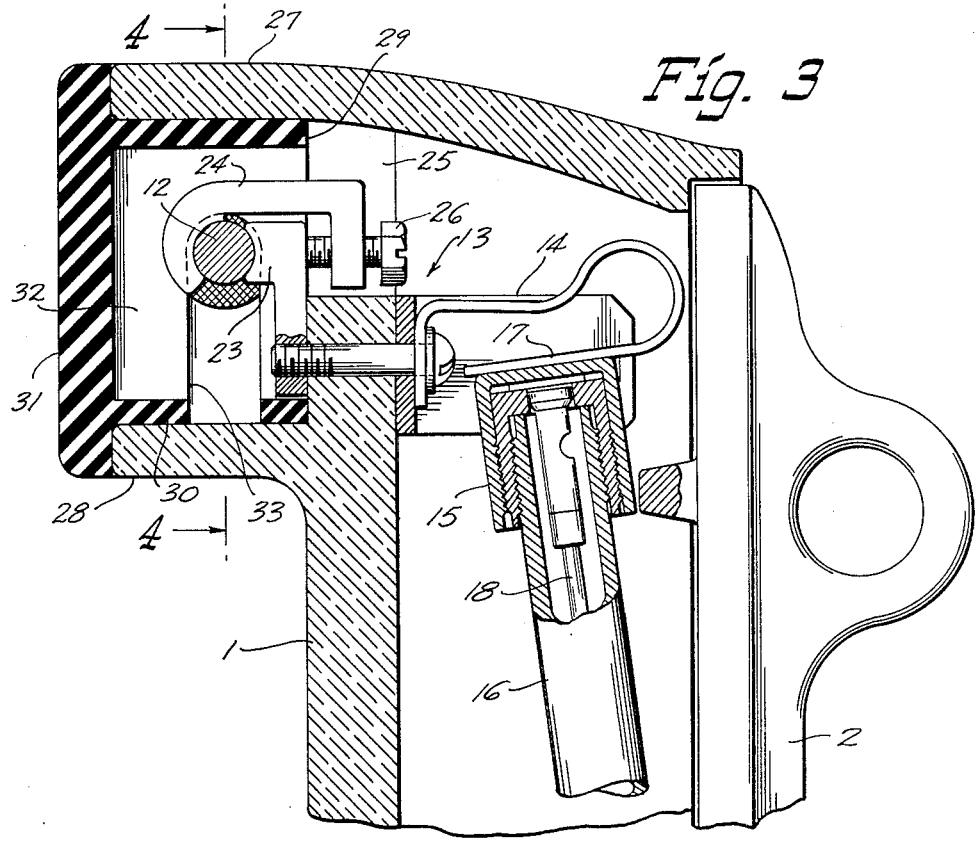
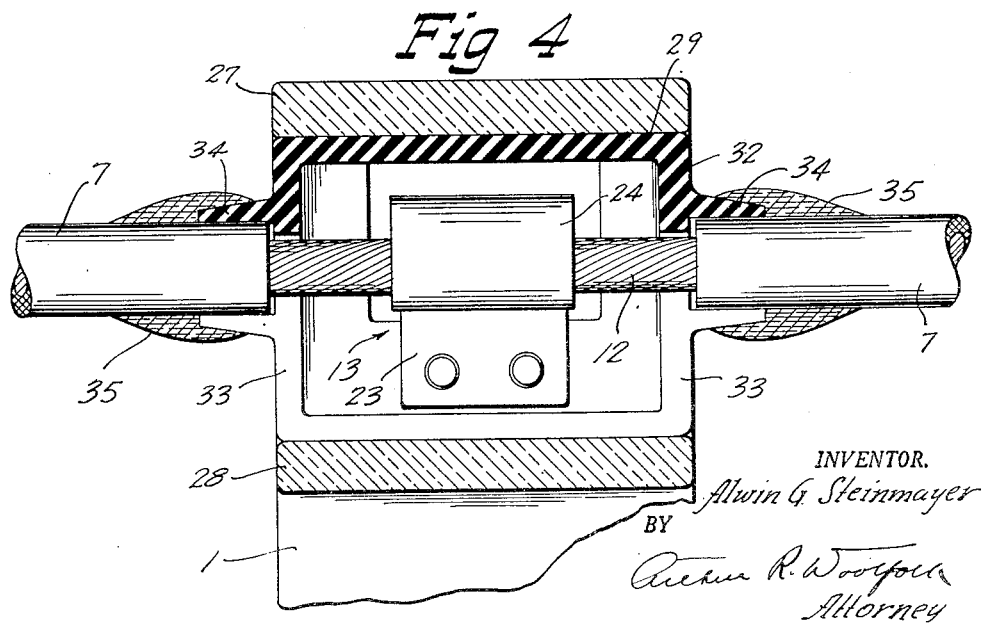

2,536,778

UNITED STATES PATENT OFFICE 2,536,778

AERIAL CABLE CUTOUT

Alwin G. Steinmayer, Milwaukee, Wis., assignor to McGraw Electric Company, a corporation of Delaware Application March 6, 1947, Serial No. 732,871

6 Claims. (Cl. 174—59)

This invention relates to cutouts and is particularly directed to a cutout construction for an aerial cable.

The present trend in electrical distribution is towards the use of what is called an aerial cable in which one or more cables are bound together by metal tapes or other means and are supported from a messenger wire so that these cables may be passed through trees without danger and also so that they will occupy a smaller amount of room on the supporting poles. In addition to this, there are, of course, many other advantages which do not concern the present invention. However, it is desirable at times to tap a single cable and to install a cutout for that cable. Heretofore it has been necessary to use a considerable amount of additional equipment in order to accomplish the above.

This invention is designed to provide a cutout construction which is particularly suited for use with an aerial cable and which is so made that it is not necessary to cut the cable at all but merely requires the stripping of a small portion of the insulation from the cable and the clamping of the exposed portion of the cable directly to one of the terminals of the cutout structure, the stripped portion being fully housed and protected from the weather.

In greater detail, further objects are to provide a cutout construction which is so made that an unbroken line conductor may be received in slots formed in a box-like removable housing member which is adapted to be positioned between rearwardly projecting flanges carried by the insulating housing of the cutout construction, and which is arranged to be held in place when the unbroken line conductor is secured by fastening means to a rear contact carried on the rear wall of the insulating housing of the cutout.

Further objects are to provide a cutout in which the insulating housing has its back wall provided with a contact adapted to electrically engage the unbroken line conductor and which contact is connected to the upper terminal of the cutout, fastening means being provided for holding the unbroken line conductor in electrical contact with the rear contact, such fastening means being accessible from the front of the housing when the front door of the housing is open.

Further objects are to provide an aerial cable cutout which is of simple construction, which is very easy to install, and which provides access not only to the cutout itself but also to the clamping means for the stripped portion of the cable.

An embodiment of the invention is shown in the accompanying drawings, in which—

Figure 1 is a front view of the cutout and an aerial cable supported from a pole.

Figure 2 is a side view of the structure shown in Figure 1.

Figure 3 is a sectional view of the upper portion of the cutout.

Figure 4 is a sectional view on the line 4—4 of Figure 3.

Referring to the drawing, it will be seen that the cutout comprises a housing 1 of porcelain or other suitable insulating material provided with a door 2 hingedly mounted as indicated at 3 in any suitable manner as, for instance, shown in the United States patent to William O. Schultz, No. Re. 22,372 of September 7, 1943, for a fuse. The housing is supported from the pole 4 in any suitable manner as by means of a bracket arrangement indicated by the reference character 5.

The device is intended to be used with an aerial cable indicated generally by the reference character 6. In using this device one of the cables; for example the cable 7, is unwound from the remaining cables 8 and 9 and looped downwardly as shown in Figure 1. This aerial cable is provided with a supporting messenger wire 10 which may be held by a suitable bracket 11 attached to the pole. The cables 7, 8, and 9 are secured to the messenger wire in any suitable manner as by means of metal tapes 11'. The unbroken cable or load line 7 has a small portion thereof bared as indicated at 12, which portion is adapted to be clamped to the upper stationary terminal assembly indicated generally by the reference character 13, see Figure 3. The upper terminal assembly comprises a pair of spring fingers 14 between which the metallic cap or upper contact 15 of the drop-out fuse tube 16 is adapted to be received. A contact spring or finger 17 bears downwardly on the upper contact or terminal of the drop-out fuse tube. This fuse tube is provided with a fuse link 18 which normally holds the fuse tube against downward sliding motion and which releases the fuse tube for downward sliding motion upon rupture of the fuse link, so that the upper terminal or contact 15 of the fuse tube moves downwardly from the upper terminal of the fuse tube assembly after rupture of the fuse link, as set forth in the above noted patent. The lower stationary terminal of the housing 1 is indicated by the reference character 19 in Figure 2, and is provided with means for receiving the load conductor 20. This lower stationary terminal 19 is provided with spring fingers 21 which grip the terminal 22 carried by the door 2. The door terminal 22 slidably receives the fuse tube 16 and allows the fuse tube to freely slide downwardly upon rupture of the fuse link to the dotted line position shown in Figure 2, for instance as set forth in detail in the above noted patent.

The upper stationary terminal assembly 13 includes a cable contacting member 23, see Figure 3, which is electrically connected to the contact fingers 17 and 14 and is adapted to engage the bared portion 12 of the cable as shown in Figure 3. The cable is held clamped to the portion 23 by means of the C-clamp 24.

It is to be noted from reference to Figure 3 that the back of the housing 1 is provided with an opening 25 adjacent its upper portion through which the Z-clamp 24 can be passed. The screw 26 of the C-clamp is accessible from the front of the housing when the door 2 is open so that the C-clamp may be tightened to thus lock the cable against the portion 23 of the upper stationary terminal assembly of the housing.

It is to be noted from Figures 2, 3, and 4 that the rear of the housing is provided with upper and lower spaced rearwardly projecting ledges or flanges 27 and 28 which receive between them the upper and lower walls 29 and 30 of a box-like member 31 formed of insulating material. This box-like member has side walls 32 which are provided with upwardly extending slots 33 which pass through the bottom wall and part-way upwardly through the side walls. These slots are adapted to receive the bared portion 12 of the cable 7 without requiring cutting of the cable. After the cable has been positioned in the slots 33, the box-like member 31 is slid forwardly into place between the ledges or projecting portions 27 and 28 of the housing 1, and thereafter the C-clamp 24 is positioned and is tightened. When this is done, it will be seen that the cable which is locked to the upper stationary terminal of the housing also serves to lock the box-like insulating member 31 in place. This member protects the otherwise exposed portion of the upper stationary terminal assembly and the adjacent portion of the cable. It is preferable to provide the box-like insulating member with outwardly projecting tapered sleeve-like flanges 34 which are arranged to be taped as indicated at 35 to the unstripped portion of the cable 7. This closes a part of the slots 33 and also prevents the entrance of water along the cable into the box-like member and provides a finished structure.

It will be noted that the slots 33 extend upwardly through the bottom portion of the sleeves or flanges 34.

It will be seen that this cutout provides means for electrically connecting an unbroken line conductor with a load conductor in a very simple and effective manner.

It will be seen further that the device is easy to install and provides an automatic cutout for normally electrically connecting an unbroken load conductor with a line conductor.

Further it will be seen that the slots 33 are relatively small and only need be slightly larger than the size of the unbroken cable or load conductor. This construction, therefore, prevents the entrance of birds and discourages the entrance of insects.

It is to be noted further that the bared portion of the cable and the adjacent portion of the upper stationary terminal are adequately housed.

While the device has been illustrated and described as used for a single phase tap on a three phase cable, it is clear that three devices could be employed if three phase service is wished for the branch line. Also it is clear that the device could be used for a single cable as well as a tap on a three phase cable.

Although this invention has been described in considerable detail, it is to be understood that such description is intended as illustrative rather than limiting, as the invention may be variously embodied and is to be interpreted as claimed.

I claim:

1. A housing for a cutout construction arranged to normally connect to an unbroken line conductor comprising an insulating housing having an open front and a rear wall, a door for said front, an upper terminal arranged to be electrically connected to the unbroken line conductor, a rear contact located on the rear side of the rear wall of said housing and electrically connected to said upper terminal and arranged to electrically engage said unbroken line conductor and being directly accessible from the rear of said housing, fastening means for holding said unbroken line conductor in electrical engagement with said rear contact, and means coacting with the rear portion of said housing and arranged to substantially enclose the rear contact and that portion of said unbroken line conductor adjacent said rear contact.

2. A housing for a cutout construction arranged to normally connect to an unbroken line conductor comprising an insulating housing having an open front and a rear wall, a door for said front, an upper terminal arranged to be electrically connected to the unbroken line conductor, a rear contact located on the rear side of the rear wall of said housing and electrically connected to said upper terminal and arranged to electrically engage said unbroken line conductor and being directly accessible from the rear of said housing, fastening means for holding said unbroken line conductor in electrical engagement with said rear contact, and a slotted box-like member of insulating material arranged to receive the unbroken line conductor in the slots and to protect the rear contact and the adjacent portion of said unbroken line conductor.

3. A housing for a cutout construction arranged to normally connect to an unbroken line conductor comprising an insulating housing having an open front and a rear wall, a door for said front, an upper terminal arranged to be electrically connected to the unbroken line conductor, a rear contact located on the rear side of the rear wall of said housing and electrically connected to said upper terminal and arranged to electrically engage said unbroken line conductor and being directly accessible from the rear of said housing, fastening means for holding said unbroken line conductor in electrical engagement with said rear contact, and a slotted box-like member of insulating material arranged to receive the unbroken line conductor in the slots and to protect the rear contact and the adjacent portion of said unbroken line conductor, said unbroken line conductor coacting with said box-like member to hold said box-like member in place when said line conductor is fastened to said rear contact.

4. A housing for a cutout construction arranged to normally connect to an unbroken line conductor comprising an insulating housing having an open front and a rear wall, a door for said front, an upper terminal arranged to be electrically connected to the unbroken line conductor, a rear contact located on the rear side of the rear wall of said housing and electrically connected to said upper terminal and arranged to electrically engage said unbroken line conductor, fastening means for holding said unbroken line conductor in electrical engagement with said rear contact, and a removable slotted box-like member of insulating material arranged to receive the unbroken line conductor in the slots and to protect the rear contact and the adjacent portion of said unbroken line conductor, said unbroken line conductor coacting with said box-like member to hold said box-like member in place when said line conductor is fastened to said rear contact, said fastening means being accessible from the front of said housing when said door is opened.

5. A housing for a cutout construction arranged to normally connect to an unbroken line conductor comprising an insulating housing having an open front and a rear wall, a door for said front, an upper terminal arranged to be electrically connected to the unbroken line conductor, a rear contact located on the rear side of the rear wall of said housing and electrically connected to said upper terminal and arranged to electrically engage said unbroken line conductor, fastening means for holding said unbroken line conductor in electrical engagement with said rear contact, a removable slotted box-like member of insulating material provided with outwardly projecting sleeve-like portions with the slots extending into sleeve-like portions and arranged to receive the unbroken line conductor in the slots and to protect the rear contact and the adjacent portion of the unbroken line conductor, and means securing said sleeve-like portions to the unbroken line conductor.

6. A housing for a cutout construction arranged to normally connect to an unbroken line conductor comprising an insulating housing having an open front and a rear wall provided with upper and lower rearwardly projecting flanges, a door for the front of said housing, an upper terminal arranged to be electrically connected to the unbroken line conductor, a rear contact on the rear face of the rear wall of said housing located between said flanges and electrically connected to said upper terminal and arranged to electrically engage the unbroken line conductor, fastening means accessible from the front of said housing when said door is open for holding the unbroken line conductor in electrical engagement with said rear contact, and a box-like insulating member having slots for the reception of the unbroken line conductor and located between said flanges and housing the rear contact and the adjacent portion of the unbroken line conductor.

ALWIN G. STEINMAYER.

REFERENCES CITED

The following references are of record in the file of this patent:

UNITED STATES PATENTS

| Number | Name | Date |
| --- | --- | --- |
| Re. 22,372 | Schultz | Sept. 7, 1943 |
| 1,148,699 | McWilliams | Aug. 3, 1915 |
| 2,114,745 | McCluskey et al. | Apr. 19, 1938 |
| 2,281,515 | Ruggieri | Apr. 28, 1942 |